United States Patent [19]
Rhodes et al.

[11] Patent Number: 4,797,238
[45] Date of Patent: * Jan. 10, 1989

[54] RAPID-SINTERING OF ALUMINA

[75] Inventors: William H. Rhodes, Lexington; George C. Wei, Weston, both of Mass.; George A. Fryburg, Newmarket, N.H.

[73] Assignees: GTE Laboratories Incorporated, Waltham; GTE Product Corp., Danvers, both of Mass.

[*] Notice: The portion of the term of this patent subsequent to Aug. 9, 2005 has been disclaimed.

[21] Appl. No.: 53,501

[22] Filed: May 12, 1987

Related U.S. Application Data

[63] Continuation-in-part of Ser. No. 802,416, Nov. 27, 1985, abandoned.

[51] Int. Cl.$^4$ .............................................. C04B 35/10
[52] U.S. Cl. ...................................... 264/65; 264/66; 501/127; 501/153
[58] Field of Search .................... 264/65, 66; 501/127, 501/153

[56] References Cited

U.S. PATENT DOCUMENTS

| | | | |
|---|---|---|---|
| 3,025,177 | 3/1962 | St. Pierre | 23/142 |
| 3,026,210 | 3/1962 | Coble | 106/39 |
| 3,377,176 | 4/1968 | Wolkodoff et al. | 166/46 |
| 3,588,573 | 6/1971 | Chen et al. | 313/221 |
| 3,711,585 | 1/1973 | Muta et al. | 264/65 |
| 3,718,601 | 2/1973 | Dentai et al. | 252/301.4 R |
| 3,792,142 | 2/1974 | Kobayashi et al. | 264/65 |
| 3,834,915 | 9/1974 | Cleveland et al. | 106/73.4 |
| 3,905,845 | 9/1975 | Kobayashi et al. | 106/62 |
| 4,204,874 | 5/1980 | Yamada | 106/73.4 |
| 4,222,978 | 9/1980 | Oda et al. | 264/65 |
| 4,285,732 | 8/1981 | Charles et al. | 106/57 |
| 4,364,877 | 12/1982 | Clément et al. | 264/1.2 |
| 4,373,030 | 2/1983 | Kaneno et al. | 501/152 |
| 4,383,957 | 5/1983 | Yamakawa et al. | 264/65 |
| 4,418,024 | 11/1983 | Prochazka et al. | 264/66 X |
| 4,490,319 | 12/1984 | Lee et al. | 264/65 |
| 4,616,996 | 10/1986 | Kajihara et al. | 432/148 |

FOREIGN PATENT DOCUMENTS

| | | | |
|---|---|---|---|
| 53-47415 | 4/1978 | Japan | 264/65 |
| 53-14247 | 5/1978 | Japan | 501/127 |
| 58-36972 | 3/1983 | Japan | 501/153 |

OTHER PUBLICATIONS

Lee et al., *J. Am. Ceram. Soc.* 43, 594 (1960).
Grimm et al., *Ceram. Bull.* 50, 962 (1971).
Peelen et al., *J. Appl. Phys.* 45, 216 (1974).
Coble, *Sintering Alumina: Effect of Atmospheres*, Journal of the American Ceramic Society, vol. 45, No. 3, 3-62, pp. 123-126.
M. P. Harmer et al., *Proc. 4th International Meeting on Modern Ceramic Technologies*, St. Vincent, Italy, Co., Amsterdam, 1980, pp. 155-162.

*Primary Examiner*—William R. Dixon, Jr.
*Assistant Examiner*—Ann M. Knab
*Attorney, Agent, or Firm*—Frances P. Craig; Martha A. Finnegan

[57] ABSTRACT

An improved process for producing a translucent polycrystalline alumina body comprising rapid-sintering a prefired compacted green body of alumina of predetermined shape is disclosed. The green body of alumina includes alumina doped with one or more sintering aids. Rapid sintering in accordance with the method of the present invention comprises the steps of raising the temperature of the prefired compacted green body of predetermined shape up to maximum sintering temperature at a heating rate greater than or equal to about 0.1° C./second and less than the rate at which the green body experiences thermal shock; and heating the green body at the maximum sintering temperature for a period of time sufficient to produce a translucent polycrystalline alumina body. The rapid sintering is carried out under a flowing gas mixture of nitrogen and at least about 2.5 volume percent hydrogen.

10 Claims, 2 Drawing Sheets

RAPID-SINTERING OF ALUMINA

This is a continuation-in-part of co-pending application Ser. No. 802,416 filed on Nov. 27, 1985 now abandoned. 22

BACKGROUND OF THE INVENTION

This invention relates to ceramic bodies and more particularly to translucent ceramic bodies containing alumina as the main ingredient.

Conventional sintering of alumina involves firing the alumina body at the sintering temperature for extended periods of time. Typically, more than three hours is required to produce a translucent alumina body. Such extended sintering times significantly limit the production rate of translucent alumina bodies. For example, U.S. Pat. No. 3,377,176 to Wolkodoff et al. discloses the production of a high-density alumina body by sintering an alumina compact doped with magnesia and yttria at 1400 to 1550° C. in oxidizing atmosphere, hydrogen or vacuum for four hours. U.S. Pat. No. 3,905,845 to Kobayashi et al. discloses the manufacturing of a polycrystalline translucent alumina body by sintering an alumina compact doped with 0.05–0.5 weight percent of yttria, 0.05–0.5 weight percent of lanthana, and 0.01–0.1 weight percent of magnesia in vacuum, hydrogen, or ammonium decomposed gas at 1600° C. to 1800° C. for 5 hours.

Conventional sintering of alumina further involves hydrogen or vacuum firing. For example, U.S. Pat. No. 3,026,177 to St. Pierre et al. discloses the production of a transparent alumina body by subjecting a compact of alumina to a first firing in hydrogen at 1650° C. to 1750° C. to effect removal of gas-containing pores from the body, and subjecting the body to a second firing in hydrogen at 1800° C. to 2000° C. for not less than 15 minutes to remove additional pores and improve the transparency of the body. U.S. Pat. No. 3,026,210 to Coble discloses the production of a high density alumina body having substantial transparency by forming a mixture of alumina powder and a small but effective amount up to 0.5 weight percent of magnesia powder into a compact, and firing the compact at 1700° C. to 1950° C. in vacuum or hydrogen for 1.5 to 4 hours. U.S. Pat. No. 4,285,732 to Charles et al. discloses the production of a translucent alumina body by sintering an alumina compact doped with magnesia (0.03 to 0.15 wt %) and an additive selected from $ZrO_2$ (0.002 to 0.07 wt %) and $HfO_2$ (0.003 to 0.12 wt %) in hydrogen at 1750 to 1950° C. for 3 hours. The cost of such firing is high. Hydrogen is an expensive gas, and use of hydrogen further requires that special furnaces equipped with safety provisions be used. In the case of vacuum firing, high-cost vacuum furnaces are required.

Fast-firing of alumina ceramics has been reported in the literature by Harmer et al. Harmer et al. have described fast firing of alumina ceramics in a zone sintering furnace at 1850° C. for 2 to 15 minutes in air or oxygen atmosphere. Proc. 4th International Meeting on Modern Ceramic Technologies, St. Vincent, Italy 28-31 May 1979, ed. P. Vincenzini, Elsevier Sci. Publ. Co. Amsterdam 1980, p. 155–162. However, the rapid sintering method reported by Harmer et al. produces optically translucent alumina ceramics only in oxygen atmosphere.

SUMMARY OF THE INVENTION

In accordance with the present invention, there is provided an improved process for producing a translucent polycrystalline alumina body comprising rapid-sintering a prefired compacted green body of alumina of predetermined shape. The green body of alumina includes alumina doped with one or more sintering aids. Rapid sintering in accordance with the method of the present invention comprises raising the temperature of the prefired compacted green body of predetermined shape up to a maximum sintering temperature at a heating rate greater than or equal to about 0.1° C./second and less than the rate at which the green body experiences thermal shock; and heating the green body at said maximum sintering temperature for a period of time sufficient to produce a translucent polycrystalline alumina body. The rapid sintering is carried out under a flowing gas mixture of nitrogen and at least about 2.5 volume percent and less than 75 volume percent hydrogen.

In accordance with a preferred embodiment of the method of the present invention, rapid sintering comprises feeding the prefired compacted green body of predetermined shape into the hot zone of a furnace to heat the green body to a maximum sintering temperature at a fast feeding speed said fast feeding speed being selected to effect a heating rate greater than or equal to about 0.1° C./second and less than the rate at which the green body experiences thermal shock such that the green body is sintered at the maximum sintering temperature for a period of time sufficient to produce a translucent polycrystalline alumina body. The hot zone of the furnace is maintained at the maximum sintering temperature throughout the rapid-sintering process. Movement of the green body through the furnace during rapid sintering is continuous and uninterrupted. The rapid sintering is carried out under a flowing gas mixture of nitrogen and at least about 2.5 volume percent and less than 75 volume percent hydrogen.

Figure 1:
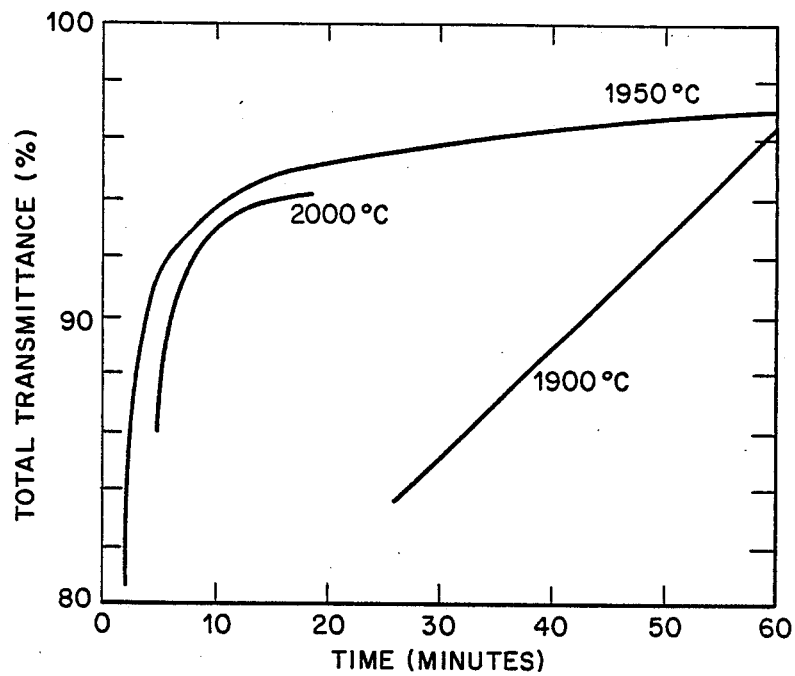
FIG. 1 shows total transmittance as a function of sintering time for MgO and $Y_2O_3$ doped $Al_2O_3$ at various sintering temperatures.

For a better understanding of the present invention together with other and further objects, advantages, and capabilities thereof, reference is made to the following disclosure and appended claims in connection with the above-described drawings.

DETAILED DESCRIPTION

Translucent polycrystalline alumina bodies having improved optical transmittance are prepared by the process of the present invention. The process of the present invention comprises rapid sintering a prefired compacted green body of predetermined shape under a flowing gas mixture of nitrogen and at least about 2.5 volume percent hydrogen.

Rapid sintering in accordance with the method of the present invention involves raising the temperature of the prefired compacted green body of predetermined shape up to a maximum sintering temperature at a heating rate greater than or equal to about 0.1° C./second and less than the rate at which the green body experiences thermal shock; and heating the green body at said maximum sintering temperature for a period of time sufficient to produce a translucent polycrystalline alumina body. The rapid sintering is carried out under a flowing gas mixture of nitrogen and at least about 2.5 volume percent hydrogen. The sintering time can be as short as 2 minutes using the present method.

In a preferred embodiment, rapid sintering includes feeding the prefired compacted green body into the hot zone of a furnace to heat the green body to a maximum sintering temperature at a fast feeding speed. The fast feeding speed is selected to effect a heating rate greater than or equal to about 0.1° C./second and less than the rate at which the green body experiences thermal shock such that the green body is sintered at the maximum sintering temperature for a period of time sufficient to produce a translucent polycrystalline alumina body. The rapid sintering is carried out under a flowing gas mixture of nitrogen and at least about 2.5 volume percent hydrogen. The hot zone of the furnace is maintained at the maximum sintering temperature. Throughout rapid sintering of the preferred embodiment, movement of the green body through the furnace is continuous and uninterrupted. In the method of the preferred embodiment, sintering can be accomplished during a sintering time as short as 2 minutes.

Most preferably, rapid sintering is carried out in a continuous belt furnace. Continuous belt furnaces are known. An example of a suitable continuous belt furnace is a tungsten heating element, tungsten belt furnace manufactured by Centorr Associates, Suncook, N.H. In a continuous belt furnace, the furnace chamber can have any configuration and is heated by tungsten heating elements. The entire chamber consists of three zones: the heating zone, the hot zone, and the cooling zone. In the heating zone, the temperature increases from ambient to the hot zone temperature as the work pieces move from the entrance point of the heating zone to the boundary of the hot zone. For the cooling zone, the temperature decreases from the hot zone temperature to ambient.

In carrying out the present process, a particulate homogeneous or at least a substantially homogeneous dispersion of alumina powder and at least one sintering aid is formed. Examples of sintering aids include MgO, $Y_2O_3$, $La_2O_3$, $ZrO_2$, $HfO_2$, $Yb_2O_3$, and mixtures thereof. MgO is the most effective of these sintering aids and is usually present alone or together with a second sintering aid. Alternatively, in the present process, if desired, an inorganic or organic precursor of the sintering aid can be used. The precursor should decompose to form the oxide and by-product gas or gases before closed porosity occurs during sintering. Representative of the precursors of the sintering aids useful in the present process are the carbonates, hydroxides, nitrates, and stearates of magnesium, yttrium, lanthanum, zirconium, and hafnium.

In carrying out the present process, the alumina can be of commercial or technical grade. Specifically, it should not contain any impurities which would have a significantly deleterious effect on the desired optical transmission properties of the resulting sintered product. Preferably the alumina powder used is at least about 99.96% pure. Most preferably the alumina powder used is about 99.99% pure and contains about 65% by weight alpha-aluminum oxide and about 35% by weight gamma-aluminum oxide.

The alumina and sintering aids, or the precursors for the sintering aids, can be admixed by a number of techniques, such as, using a propeller mixer for wet mixing to produce a significantly or substantially uniform or homogeneous dispersion or mixture. The more uniform the dispersion, the more uniform is the microstructure, and therefore, the properties of the resulting sintered body.

Mixing may be carried out with the charge suspended in a liquid medium in which the additives are dissolved. Typical liquids include water. Mixing time varies widely and depends largely on the amount and type of mixing equipment. In general, mixing time ranges from about 1 hour to about 100 hours. Wet mixed material can be dried by a number of conventional techniques to remove the liquid medium. Preferably, it is dried by spray drying.

In the present dispersion the average crystallite size ranges from about 0.05 micron, i.e., a mean specific area of about 30 $m^2/g$, to less than one micron. An average crystallite size less than about 0.01 micron is not useful since it is generally difficult or impractical to compact the powder to densities of at least 30% of the theoretical. On the other hand, an average crystallite size of one micron or higher will produce a ceramic body with a final density lower than the theoretical density of sapphire.

A number of techniques can be used to shape the powder mixture, i.e., homogeneous dispersion, into a green body. For example, it can be extruded, injection molded, die-pressed, isostatically pressed, or slip cast to produce the green body of desired shape. Any lubricants, binders, or similar materials used in shaping the powder mixture should have no significant deteriorating effect on the resulting sintered body. Such materials are preferably of the type which evaporate on heating at relatively low temperatures, preferably below 500° C., leaving no significant residue. The green body should have a density of at least 30%, and preferably 45% or higher, of the theoretical density of 3.986g/cc for alumina, to promote densification during sintering and achieve attainment of theoretical density.

Preferably, before sintering, the green body or compact is prefired in an oxygen-containing atmosphere such as air at a temperature ranging from about 800° C. to about 1300° C. More preferably, the prefiring temperature is about 1200° C. to eliminate impurities including shaping aids and water which would have a significantly deleterious effect on the optical translucency of the sintered body. The particular prefiring temperature and period is determinable empirically and depends largely on the level of impurities present and on the thickness of the body, and generally ranges from about one to five hours. Such prefiring allows the sintering atmosphere to be free of impurities, and imparts sufficient strength to the compact allowing it to be more easily handled and machined.

The rapid-sintering process of the present invention is carried out under a flowing mixture of nitrogen and hydrogen. The mixture must contain a volume percent of $H_2$ greater than or equal to about 2.5%. Most preferably the mixture contains a volume percent of $H_2$ greater than or equal to about 2.5% and less than 75%. The particular flow rate depends on the size of the furnace chamber. For the examples discussed later, the flow rate was about 0.25 cfm (7.0 lpm) for a furnace cross section of about 2 inch by 0.5 inch. Flow rates to as low as 1 lpm would also be effective.

The use of a sintering atmosphere containing nitrogen and an amount of hydrogen greater than or equal to about 2.5 volume percent and less than 75 volume percent creates a significant economic advantage as well as safety advantage over using pure hydrogen. Because hydrogen is an expensive gas, reducing the amount of hydrogen in the sintering atmosphere to an amount greater than or equal to about 2.5 and less than 75 volume percent results in a substantial cost savings. Additionally, a reduction in the amount of hydrogen in the sintering atmosphere improves the overall safety of the process. This is especially true when the amount of hydrogen used is less than the explosive limit of 18 volume percent hydrogen.

The alumina powder used in examples of Tables I–III was a high-purity (99.99%), fine $Al_2O_3$ powder with an ultimate particle size of 0.05 micron and a specific surface area of 30 $m^2/g$. The mean agglomerate size was less than 2 microns. The powder contained 65% alpha-$Al_2O_3$ and 35% gamma-$Al_2O_3$. Other types of high-purity, fine $Al_2O_3$ powders from commercial sources could be used.

Dopants were added by mixing the alumina in water solutions of $Mg(NO_3)_2$ alone, or $Mg(NO_3)_2$ plus $Y(NO_3)_3$. The resulting slurry was spray dried. Green compacts in the form of tubes were made by cold isostatic pressing. The green tubes were prefired at 1200° C. in air for 2 hours.

Green tubes placed on tungsten trays supported by the belt were fed into the hot zone of the furnace at different speeds corresponding to different heating rates, and moved through the hot zone at a speed to result in a predetermined sintering time at the desired sintering temperature. Trays made of any materials other than tungsten are compatible with alumina and the sintering atmosphere can also be used.

high-temperature tungsten-belt furnace manufactured by Centorr Associates, Suncook, N.H. The tungsten-belt furnace used had a heating zone approximately 400 mm long; a hot zone 50 mm wide by 12 mm high by 200 mm long; and a cooling zone approximately 400 mm long. Green tubes prefired at 1200° C. used in these sintering runs consisted of alumina powders doped with either the double sintering aids (MgO and $Y_2O_3$, 500 ppm each) or the sole sintering aid (500 ppm MgO). The flow rate was about 0.25 cfm (7.0 lpm) for a furnace cross section of about 2 inch by 0.5 inch.

Figure 2:
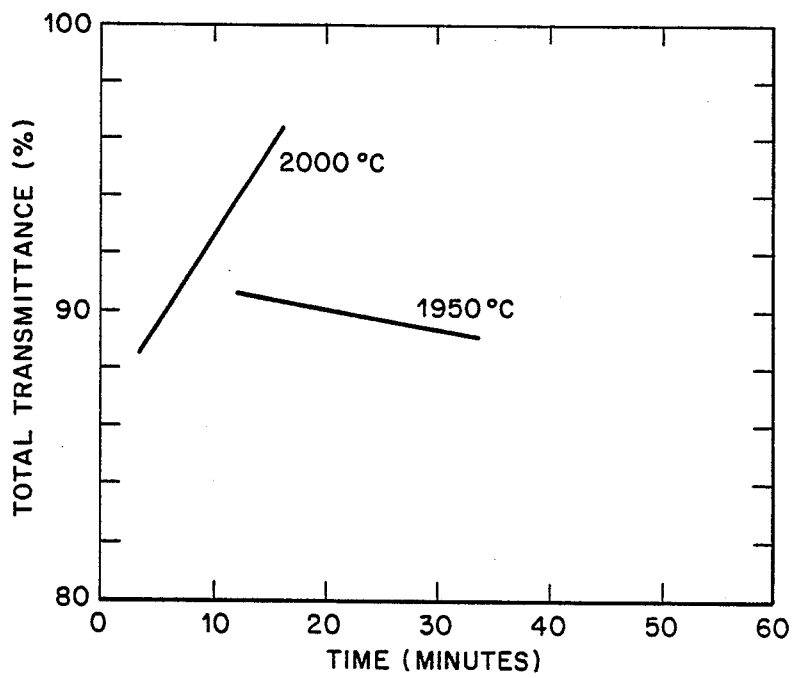
FIG. 2 shows total transmittance as a function of sintering time for MgO-doped $Al_2O_3$ at various sintering temperatures.
Figure 3:
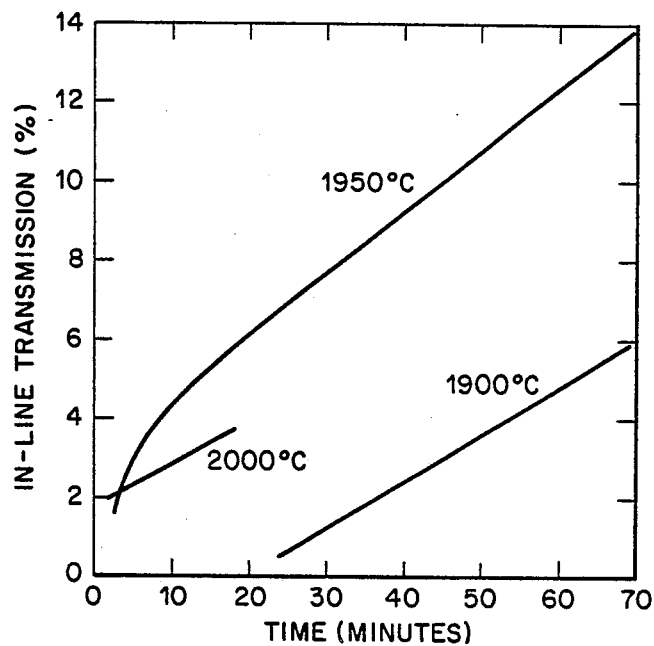
FIG. 3 shows in-line transmittance as a function of sintering time for MgO and $Y_2O_3$ doped $Al_2O_3$ at various sintering temperatures.
Figure 4:
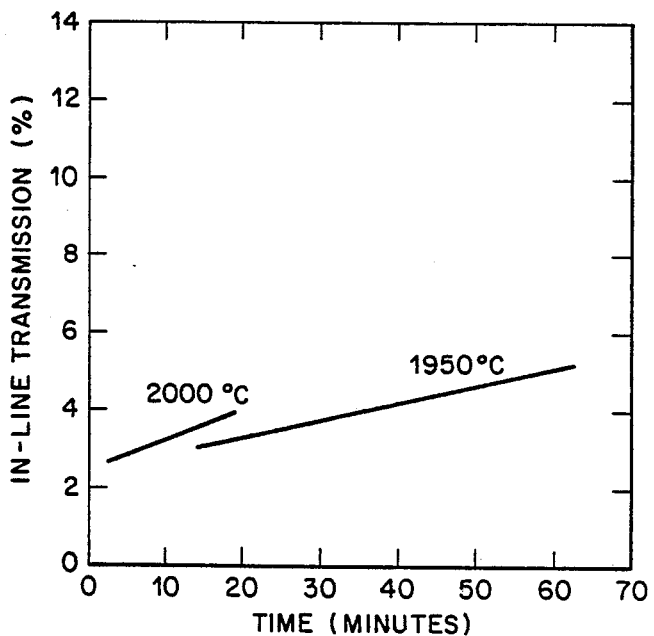
FIG. 4 shows in-line transmittance as a function of sintering time for MgO-doped $Al_2O_3$ at various sintering temperatures.

FIGS. 1 through 4 show the effect of sintering time on the transmittance of doped alumina tubes. The rapidly sintered alumina tubes represented by the data in FIGS. 1 through 4 were rapidly sintered in a continuous belt furnace under a flowing gas mixture of nitrogen with 8% hydrogen. FIGS. 1 and 3 show total transmittance and in-line transmittance respectively, as a function of sintering time for rapidly sintered MgO plus $Y_2O_3$ doped alumina tubes sintered at maximum sintering temperatures of 1900° C., 1950° C., and 2000° C. FIGS. 2 and 4 show total transmittance and in-line transmittance, respectively, as a function of sintering time for rapidly sintered MgO doped alumina tubes sintered at maximum sintering temperatures of 1950° C. and 2000° C.

As shown in FIGS. 1, 2, 3, and 4, among all the rapidly sintered alumina tubes, the $A_2O_3$ doped with $Y_2O_3$ 203 and MgO and sintered at 1950° C. for 5 min. show a 92% total transmittance and 3% in-line transmittance. Sintering at 1950° C. for 1 hour results in high transmittance (97.0+0.1% total transmittance and 12.3+1.2% inline transmittance). For tubes rapidly sintered at 1950° C. and below, the transmittance of the MgO-doped $Al_2O_3$ was generally less than that of the $Y_2O_3$ plus MgO-doped $Al_2O_3$. However, sintering at 2000° C. for 15 minutes produced 95.7%-transmittance for MgO-doped $Al_2O_3$ and 94.0% transmittance for $Y_2O_3$-plus MgO-doped $Al_2O_3$. Table I lists the results of samples sintered in a high-temperature tungsten-belt furnace at a heating rate of 0.25° C. per second.

TABLE I

Results of rapid sintering of $Al_2O_3$ in a high-temperature tungsten-belt furnace.
Heating rate was 0.25° C./s. (Tube dimensions: 0.4" OD, 0.3" ID, and 3.8" length)

| Dopants (Percent by Weight) | Air Prefiring (°C.) | Vacuum Outgassing (°C.) | Atmosphere | Temp. (°C.) | Time (min) | Transmit. (%) Total | In-line | Average grain size (μm) |
|---|---|---|---|---|---|---|---|---|
| 0.05 MgO + 0.05 $Y_2O_3$ | 1200 | No | $N_2$—8% $H_2$ | 1915 | 30 | 85 | 1.33 | 8.7 |
| 0.05 MgO + 0.05 $Y_2O_3$ | 1200 | No | $N_2$—8% $H_2$ | 1890 | 60 | 96.3 | 4.93 | 15.3 |
| 0.05 MgO + 0.05 $Y_2O_3$ | 1200 | 500 | $N_2$—8% $H_2$ | 1950 | 15 | 94.8 | 5.16 | 16.5 |
| 0.05 MgO + 0.05 $Y_2O_3$ | 1200 | 500 | $N_2$—8% $H_2$ | 1950 | 30 | 95.3 | 8.08 | 24.1 |
| 0.08 MgO | 1200 | 500 | $N_2$—8% $H_2$ | 1950 | 15 | 90.4 | 3.19 | 21.5 |
| 0.05 MgO + 0.05 $Y_2O_3$ | 1200 | 500 | $N_2$—8% $H_2$ | 1950 | 5 | 92.0 | 3.00 | 7.1 |
| 0.05 MgO + 0.05 $Y_2O_3$ | 1200 | 500 | $N_2$—8% $H_2$ | 1950 | 2 | 82.0 | 1.43 | 3.0 |
| 0.05 MgO + 0.05 $Y_2O_3$ | 1200 | No | $N_2$—8% $H_2$ | 2000 | 5 | 88.0 | 2.35 | 8.3 |
| 0.08 MgO | 1200 | No | $N_2$—8% $H_2$ | 2000 | 5 | 89.3 | 2.98 | 8.7 |
| 0.05 MgO + 0.05 $Y_2O_3$ | 1200 | No | $N_2$—8% $H_2$ | 2000 | 15 | 94.0 | 3.29 | 17.2 |
| 0.08 MgO | 1200 | No | $N_2$—8% $H_2$ | 2000 | 15 | 95.7 | 3.47 | 20.2 |
| 0.05 MgO + 0.05 $Y_2O_3$ | 1200 | No | $N_2$—8% $H_2$ | 1950 | 60 | 97.0 | 12.33 | 47.0 |
| 0.08 MgO | 1200 | No | $N_2$—8% $H_2$ | 1950 | 60 | 93.8 | 5.01 | 28.3 |
| 0.05 MgO + 0.05 $Y_2O_3$ | 1200 | 500 | $N_2$—8% $H_2$ | 2000 | 10 | 93.0 | 3.02 | 19.2 |
| 0.08 MgO | 1200 | 500 | $N_2$—8% $H_2$ | 2000 | 10 | 89.2 | 3.01 | 16.4 |
| 0.05 MgO + 0.05 $Y_2O_3$ | 1200 | No | $N_2$ | 1950 | 30 | 84.8 | 0.98 | 12.5 |
| 0.05 MgO + 0.05 $Y_2O_3$ | 1200 | No | $N_2$ | 1950 | 60 | 82.8 | 0.92 | 25.4 |
| 0.05 MgO + 0.04 $ZrO_2$ | 1200 | No | $N_2$ | 1950 | 60 | 83.6 | 1.06 | — |
| 0.05 MgO + 0.04 $ZrO_2$ | 1200 | No | $N_2$—8% $H_2$ | 1975 | 45 | 95.9 | 10.33 | 62.5 |
| 0.05 MgO | 1200 | No | $N_2$—8% $H_2$ | 1975 | 45 | 96.0 | 4.62 | 35.4 |
| 0.05 MgO + 0.05 $Y_2O_3$ | 1200 | No | $N_2$—8% $H_2$ | 1975 | 45 | 97.2 | 8.95 | 34.7 |

The sintering runs of Tables I–III were conducted at temperatures from about 1890° C. to 2000° C. for various durations under a flowing gas mixture of nitrogen and from about 2.5 to 8 volume percent hydrogen in a Table II lists the results of samples heated at various rates. Using an optical pyrometer sighting on a Mo black body, the temperature profile along the direction of the belt movement inside the chamber of the furnace was obtained. When the center of the hot zone was 1950° C. and the hot zone was in a flowing $N_2$-8% $H_2$ gas, the temperature gradient in the heating zone was about 4.5° C./mm. The nonisothermal condition in the heating zone and the distribution of temperatures inside the hot zone would cause nonuniform sintering and dimensional variations in long (>90 mm) tubes if the tubes were stationary in the hot zone. The continuous movement of a tube through the hot zone, however, imposes identical sintering conditions for every portion of the tube as a function of time.

Table III lists additional results. At a feeding rate of 0.7 mm/s, which corresponds to a heating rate of 3° C./s, three tubes (0.4" OD by 0.3" ID by 3.8" long) of MgO plus $Y_2O_3$ doped $Al_2O_3$ were sintered at 1950° C. for 1 hour to 97% total transmittance and 9% in-line transmittance. The results, along with previous results, indicated that for tubes of this size, a total transmittance of 97% and an in-line transmittance of greater than or equal to 9% could be routinely achieved by heating at a rate less than 3° C./s and rapid-sintering at 1950° C. for 1 hour under $N_2$-8% $H_2$.

TABLE III

Results of Rapid Sintering of $Al_2O_3$ Tubes (Doped with MgO and $Y_2O_3$) of Various Length

| Tube Size | Feeding Rate (mm/s) | Heating Rate (°C./s) | Outgassing (°C.) | Sintering Temperature (°C.) | Time (h) | Atmosphere | Transmittance (%) Total | In-Line |
|---|---|---|---|---|---|---|---|---|
| 150 W[a] | 0.7 | 3 | no | 1950 | 1 | $N_2$—8% $H_2$ | 97.0 | 9.59 |
| " | 0.7 | 3 | no | 1950 | 1 | $N_2$—8% $H_2$ | 97.1 | 9.25 |
| " | 0.7 | 3 | no | 1950 | 1 | $N_2$—8% $H_2$ | 96.7 | 9.12 |
| 400 W[b] | 0.06 | 0.25 | no | 1950 | 0.5 | $N_2$—8% $H_2$ | 94.4 | 1.70 |
| " | 0.06 | 0.25 | no | 1950 | 0.5 | $N_2$—8% $H_2$ | 93.8 | 1.74 |
| " | 0.06 | 0.25 | no | 1950 | 0.5 | $N_2$—8% $H_2$ | 94.6 | 1.64 |
| 1000 W[c] | 0.06 | 0.25 | 500 | 1950 | 1 | $N_2$—8% $H_2$ | 88.0 | 4.82 |
| " | 0.06 | 0.25 | 500 | 1950 | 1 | $N_2$—8% $H_2$ | 91.6 | 6.55 |
| " | 0.06 | 0.25 | 500 | 1950 | 1 | $N_2$—8% $H_2$ | 90.5 | 6.24 |

[a]150 W Tube dimensions: 0.4" ODX, 0.3" IDX, 3.8" length.
[b]400 W Tube dimensions: 0.5" ODX, 0.4" IDX, 6" length
[c]1000 W Tube dimensions: 0.4" ODX, 0.3" IDX, 12" length.

TABLE II

Results of Rapid Sintering of $Al_2O_3$ doped with MgO and $Y_2O_3$ at 1950° C. under $N_2$—8% $H_2$ in a high-temperature tungsten-belt furnace at various heating rates.
(Tube dimensions: 0.4" OD, 0.3" ID, and 3.8" length)

| Feeding Rate (mm/s) | Heating Rate (°C./s) | Time at 1950° C. (min) | Transmittance (%) Total | In-line | Grain Size (μm) |
|---|---|---|---|---|---|
| 0.3 | 1.5 | 60 | 96.7 | 8.85 | 29.3 |
| 0.3 | 1.5 | 60 | 96.7 | 9.13 | — |
| 0.3 | 1.5 | 60 | 97.1 | 9.64 | — |
| 4.0 | 19 | a | a | a | — |
| 1.4 | 6 | 60,[b] | 90.3 | 4.57 | 32.9 |
| 1.4 | 6 | 60,[b] | 93.2 | 7.38 | — |
| 0.7 | 3 | 30 | 96.1 | 6.51 | 12.9 |
| 0.7 | 3 | 30 | 96.2 | 5.27 | — |
| 0.7 | 3 | 30 | 96.3 | 6.38 | — |
| 0.6 | 0.25 | 30 | 95.3 | 8.08 | — |
| 0.6 | 0.25 | 60 | 97.0 | 12.33 | — |

[a]tubes cracked before arrival in the hot zone.
[b]tubes were stationary in the hot zone, the back end of the tube cracked.

This continuous movement results in uniform shrinkage and improved dimensional control in the tube. This has been confirmed in two different runs with the tubes being stationary in the hot zone in one run and moving through the hot zone at a constant speed in the other run. Because of the relatively steep gradient in the heating zone adjacent to the hot zone in the furnace used in the present examples, the feeding rate of the green tubes was kept below 1.4 mm/s to prevent thermal shock and cracking. At a feeding rate of 1.4 mm/s (a heating rate of 6° C./s), some small cracks were present in the insert region near the back end of the sintered tubes. For feeding rates at 0.7 mm/s and below (equal to or less than 3° C./s), the tubes were translucent and crack-free. The total transmittance of the tubes described in Table II did not show significant changes with the heating rate, but the in-line transmittance generally decreased with increasing heating rate.

The prefered $Al_2O_3$ tube is porous which leads to absorption of gases upon exposure to the ambient atmosphere prior to final sintering. Tables I and III summarize a number of experiments where a 500° C. vacuum outgassing procedure was employed just prior to insertion of the alumina tube into the belt furnace. These experiments were designed to test the importance of removing the absorbed species e.g., $H_2O$, on the tungsten or molybdenum boats and on the optical transmittance of the sintered $Al_2O_3$. When closed molybdenum boats were employed the vacuum outgassing step prevented molybdenum oxidation and the subsequent alumina discoloration. However, there was no apparent advantage of this step if open tungsten boats were employed, but this step could be important under more humid conditions.

Green tubes consisting of alumina powders doped with the sintering aids MgO or $Y_2O_3$, or MgO plus $ZrO_2$ were sintered in pure $N_2$. They all showed poor transmittance, i.e., less than 90% total, and less than 2% in-line. A comparison of the results of rapid sintering in $N_2$ with the results of rapid sintering in $N_2$-8% $H_2$ showed a significant beneficial effect on sintering rates by including at least about 2.5 volume percent of $H_2$ in the $N_2$ atmosphere.

Microstructures of alumina tubes rapidly sintered in $N_2$-8% $H_2$ were examined. These included optical microscopic examinations of polished sections and scanning electron microscopic examinations of the as-sintered surface. The $Al_2O_3$ doped with MgO plus $Y_2O_3$ had a bimodal distribution of grain size whereas the alumina doped with MgO showed equiaxed microstructures. At 1950° C., the average grain size in the $Al_2O_3$ doped with MgO plus $Y_2O_3$ increased with time. This is shown by the results reported in Table I. The exponent dependence of the average grain size on time was between 1 and 0.05, suggesting a liquid-phase grain growth mechanism.

Electron microprobe analysis of the tube heated at 0.25° C./s and sintered at 1950° C. for 60 minutes in $N_2$-8% $H_2$ showed second phase particles containing Al and Y at grain boundary triple points. In addition, magnesium aluminate spinel particles were observed.

The positive effects of the $N_2$-$H_2$ atmosphere used in the rapid sintering runs on the optical transmittance of the arc tubes were unexpected.

While there has been shown and described what are at present considered to be the preferred embodiments of the invention, it will be obvious to those skilled in the art that various changes and modifications can be made therein without departing from the scope of the invention as defined by the appended claims.

What is claimed is:

1. A process for producing a translucent polycrystalline alumina body comprising:
    rapid-sintering a prefired, compacted green body of predetermined shape under a flowing gas mixture of nitrogen and at least about 2.5 volume percent and less than 75 volume percent hydrogen, the green body comprising alumina doped with one or more sintering aids, said rapid-sintering comprising the steps of:
    raising the temperature of said prefired compacted green body of predetermined shape up to a maximum sintering temperature at a heating rate greater than or equal to about 0.1° C./second and less than the heating rate at which the green body experiences thermal shock; and
    heating the green body at said maximum sintering temperature for a period of time sufficient to produce a translucent polycrystalline alumina body.

2. A process in accordance with claim 1 wherein the mixture of $N_2$ and $H_2$ contains a volume percent of $H_2$ from about 2.5% to about 8%.

3. A process for producing a translucent polycrystalline alumina body comprising:
    rapid-sintering a prefired, compacted green body of predetermined shape under a flowing gas mixture of nitrogen and at least about 2.5 volume percent and less than 75 volume percent hydrogen, the green body comprising alumina doped with one or more sintering aids, by feeding said prefired compacted green body of predetermined shape into the hot zone of a furnace at a fast feeding speed to heat the green body to a maximum sintering temperature; said fast feeding speed being selected to effect a heating rate greater than or equal to about 0.1° C/second and less than the heating rate at which the green body experiences thermal shock such that the green body is sintered at said maximum sintering temperature for a period of time sufficient to produce a translucent polycrystalline alumina body;
    movement of the green body through said furnace during rapid-sintering being continuous and uninterrupted, and the hot zone of said furnace during rapid-sintering being maintained at the maximum sintering temperature.

4. A process in accordance with claim 3 wherein the furnace is a continuous belt furnace.

5. A process in accordance with claim 3 wherein the volume percent $H_2$ is about 2.5% to about 8%.

6. A process in accordance with claim 4 wherein the mixture of $N_2$ and $h_2$ contains a volume percent of $H_2$ of about 2.5% to about 8%.

7. A process in accordance with claim 6 wherein the sintering aid is selected from the group consisting of MgO, $Y_2O_3$, $La_2O_3$, $ZrO_2$, $HfO_2$, $Yb_2O_3$ and mixtures thereof.

8. A process in accordance with claim 7 wherein the maximum sintering temperature is 2000° C.

9. A process according to claim 1 wherein the flowing gas mixture contains nitrogen and an amount of hydrogen greater than or equal to about 2.5 volume percent and less than or equal to about 18 volume percent.

10. A process according to claim 3 wherein the flowing gas mixture contains nitrogen and an amount of hydrogen greater than or equal to about 2.5 volume percent and less than or equal to about 18 volume percent.

* * * * *